April 16, 1929.  J. DE BRACHT  1,709,660
AMUSEMENT DEVICE
Filed Sept. 30, 1927   2 Sheets-Sheet 1
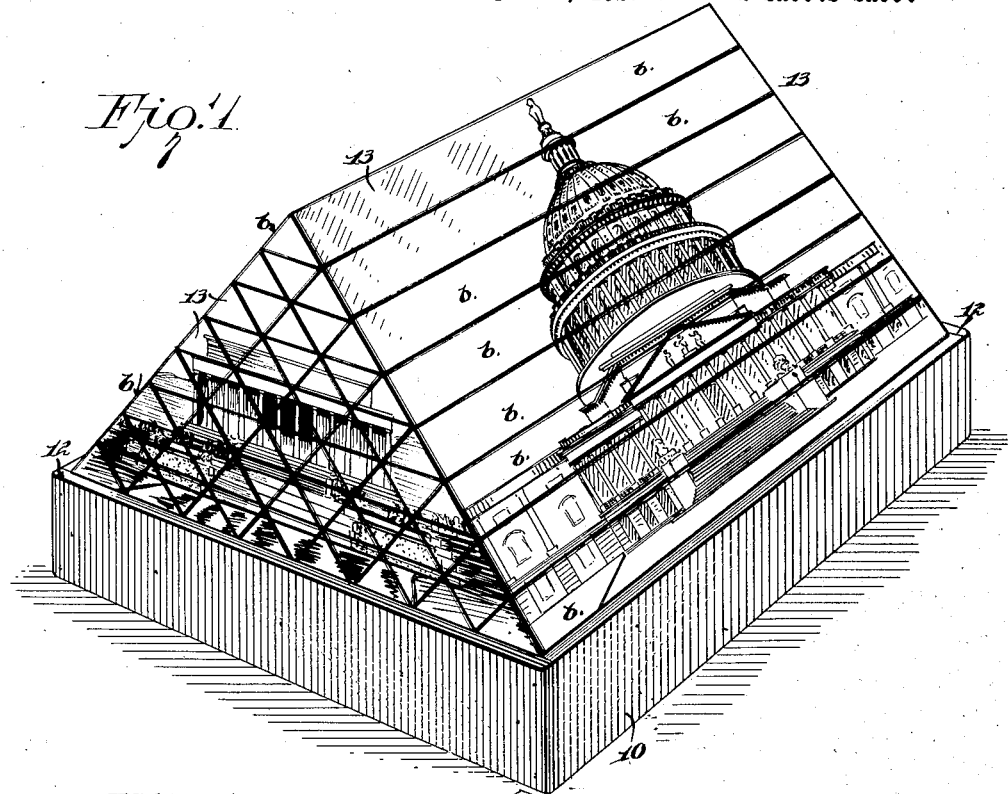
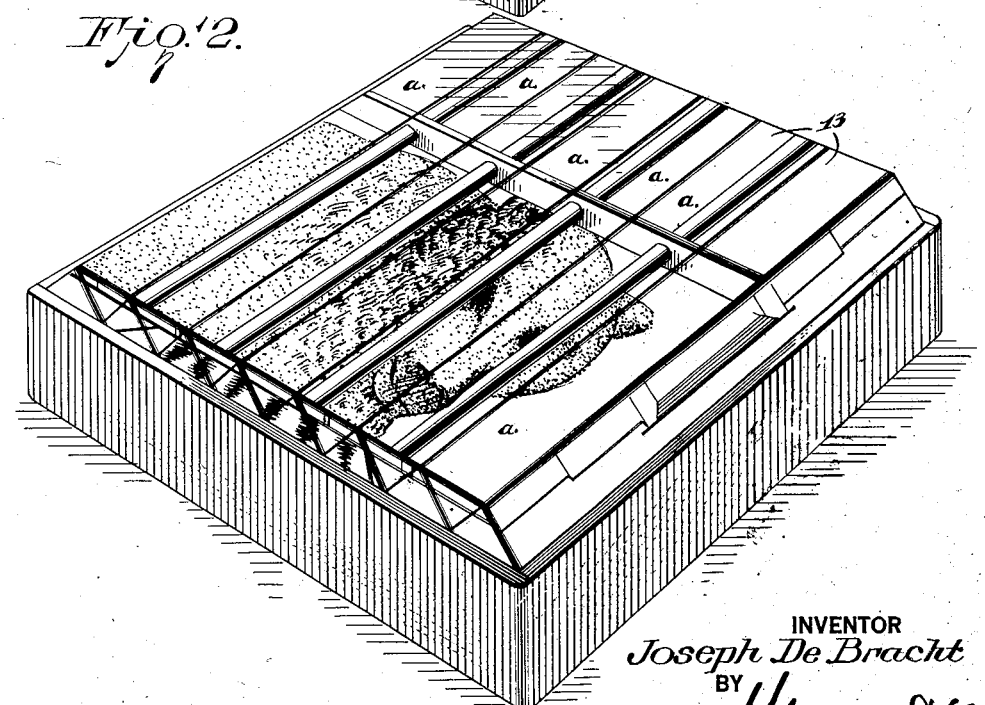
INVENTOR
Joseph De Bracht
BY
ATTORNEY April 16, 1929.　　　　J. DE BRACHT　　　　1,709,660
AMUSEMENT DEVICE
Filed Sept. 30, 1927　　　2 Sheets-Sheet 2
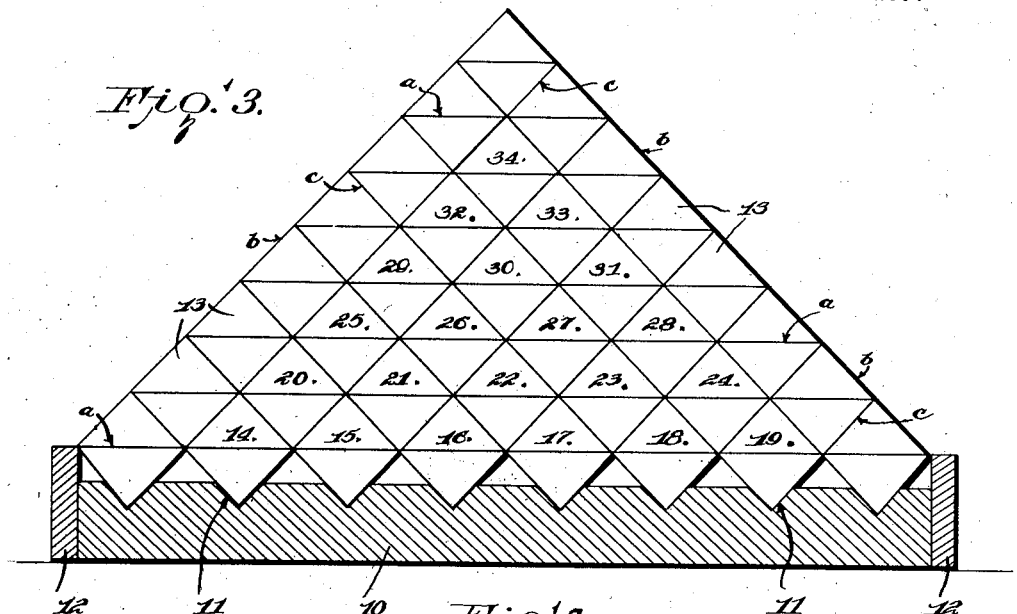
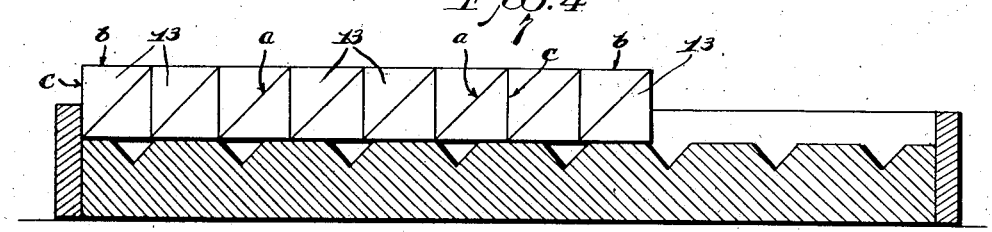
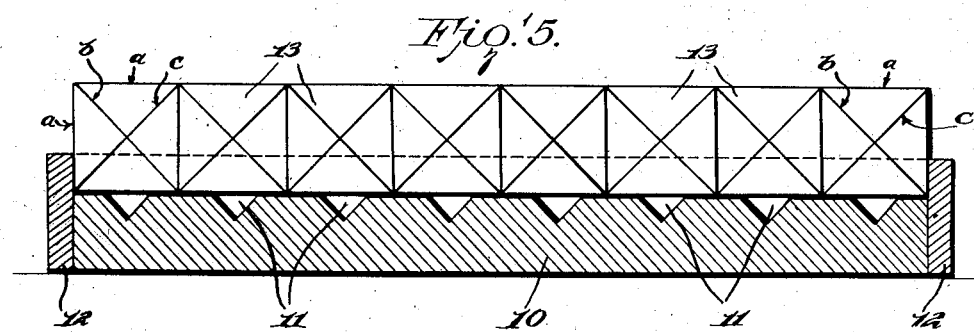
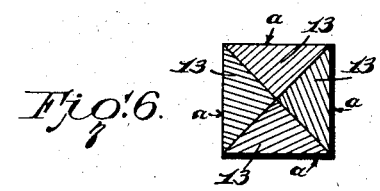
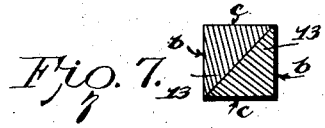
INVENTOR
Joseph De Bracht
BY
ATTORNEY Patented Apr. 16, 1929.

1,709,660

UNITED STATES PATENT OFFICE.

JOSEPH DE BRACHT, OF ALTOONA, PENNSYLVANIA, ASSIGNOR OF ONE-HALF TO ROBERT BLAIR GABLE, OF ALTOONA, PENNSYLVANIA.

AMUSEMENT DEVICE.

Application filed September 30, 1927. Serial No. 223,110.

This invention relates to improvements in amusement devices generally, and more particularly to a type of the same, which is of educational value in use as well as amusing and entertaining.

The principal object of the invention is to provide for a device of the class set forth, and one embodying a number of elements or members, which are to be assembled together into various combinations, each producing a completed picture or representation of an object, building, place or scene, and wherein the proper assembling of the elements or members into a given combination necessitates care, thought and skill in the selection of a number of the elements or members to form or produce a desired picture or representation.

With the foregoing and other equally important objects in view, the invention resides in the certain new and useful construction of parts as will be hereinafter more fully described, set forth in the appended claims, and illustrated in the accompanying drawings, in which:

Figure 1 is a perspective view of a preferred embodiment of the invention, and showing a complete assembly of the elements or members to form or produce four pictures or representations, Figure 2 is a similar view showing a single picture or representation formed or produced by the first of the superimposed layers of elements or members employed in building up the completed assembly as in Figure 1, Figure 3 is a vertical transverse section through the supporting base and the assembly of elements or members as it appears in Figure 1, Figure 4 is a view similar to that of Figure 3, but showing another combination of elements or members in assembly to form or produce a single picture or representation, Figure 5 is another view similar to that of Figure 3, but showing a further combination of elements or members to form or produce a single picture or representation, Figure 6 is a vertical transverse section through a single group or assembly of the elements or members as employed in the arrangement of a number of such groups as shown in Figure 5, and Figure 7 is a similar view of a single group or assembly of the elements or members in the arrangement of a number of such groups, as shown in Figure 4.

Referring to the drawings, wherein similar characters of reference designate corresponding parts throughout the several views thereof, the numeral 10 indicates a base-board or support, preferably rectangular in form, and having its upper face provided with a plurality of equidistantly spaced V-shaped channels or grooves 11. Surrounding the side and end edges of the base-board or support 10 are flanges or wall members 12, which are abutted at their opposite ends, and have their top edges projected at a distance above the upper channelled or grooved face thereof, and in a manner that the completed base-board or support has the general form of a tray.

The elements or members 13 to be employed with the base-board or tray 10 are each in the form of three-sided strips of substantially triangular formation in cross section, and are of a length to be laid on the upper face of the base-board or tray 10, in a direction parallel to the channels or grooves 11 therein, and with their opposite ends in the planes of the inner faces of the end flanges or walls 12.

The several triangular elements or members 13 each have their three side faces $a$, $b$, and $c$, and their opposite end faces $d$, marked or otherwise provided with portions of pictorial representations of objects and subjects, such as animals, buildings, persons, places or things of an amusing, educational and an historical nature, all in a manner that by properly selecting a required number of the elements or members and assembling them together with corresponding faces disposed in either of a horizontal or an inclined plane, a completed picture, or pictures, will be formed or produced.

In the use of the device, any number of the elements or members 13 may be provided to present an almost unlimited number of objects or subjects, but, for convenience in description and clearness of understanding of the salient features of the invention, eighty-three (83) of the elements or members are employed in the present instance to obtain thirty-one (31) illustrations or pictures, by assembling in groups or layers in superimposed relation on the base-board or tray 10, and as follows:

Select thirty-two (32) of the elements or members 13, and assemble the same into eight (8) groups of four (4) each, abutting the narrow faces $b$ and $c$ of the same in each group together to form the substantially square or rectangular units, as shown in Figure 6, which arrangement exposes the wider faces $a$ of each element or member 13 at the four sides of each group or unit. Now, by assembling the eight groups or units in side to side relation on the upper side of the base board or tray 10, within the confines of the flanges or side and end walls 12, as shown in Figure 5, and properly matching the portions of the pictorial representation on the uppermost faces $a$, a completed picture will be viewed. By now giving each group or unit of the elements or members a quarter turn in one direction or the other, a different picture will be formed and exposed to view, in all, four (4) different pictures in number, when all four (4) faces $a$ have been disposed in uppermost position. Further pictures can not be formed by selecting sixteen (16) of the thirty-two (32) elements or members 13 previously used, which, when properly matched, are to be assembled into eight (8) groups or units of two (2) each, in which case, the wider faces $a$ of the two (2) elements or members 13 of each group or unit will be disposed in abutting relation, so that the narrower faces $b$ and $c$ of each element or member 13 are exposed at the four sides of each group or view, as shown in Figure 7. These groups or units may now be assembled in abutting relation on the upper face of the base-board or tray 10, substantially as shown in Figure 4, when, with the portions of the pictorial representation on the uppermost faces $b$ or $c$, as the case may be, properly matched together, a completed picture will be formed and exposed to view. Now, by giving each group or unit a quarter turn in the proper direction, four (4) completed pictures will be successively formed and exposed to view as the several matched faces $b$ and $c$ are brought to their uppermost portions. By now discarding these selected sixteen (16) of the elements or members 13, and assembling the remaining sixteen (16) of the first thirty-two (32) of the same selected, and arranging and manipulating them in a like manner, four (4) other pictures will be produced.

In the pyramidal assembly of certain of the elements or members 13 on the base-board or tray 10, eight (8) of the elements or members 13 will be selected, so that the positions of the pictorial representations on their wider faces $a$ will match to form a completed picture. To form this picture, the eight (8) elements or members 13 selected will be laid in proper order in the channels or grooves 11, with their wider faces $a$ uppermost, in which position the picture will be exposed, and at the same time the faces $a$ will form a plane horizontal surface enclosing the upper face of the base-board or tray 10 within the confines of the flanges or side and end walls 12, upon which other of the several remaining elements or members 13 will be laid. However, in the further assembling of the several remaining elements or members 13 on the first group of eight (8) just placed in position on the base-board or tray 10, twenty-one (21) of the thirty-two (32) of the same first selected for play are to be selected for use as fillers, and these should be those whose pictorial portions on their several faces $a$, $b$ and $c$ are not to be employed in the forming of subsequent pictures. By reference to Figure 3, these filler elements or members have been indicated by the numerals reading from 14 to 34 inclusive for convenience in definitely locating their positions in the completed assembly as illustrated therein. These filler elements or members 13, however, must be selected and positioned in the completed pyramidal assembly with care for the forming of completed pictures at the opposite ends of the latter, as will be apparent by reference to Figure 1.

Having laid the first eight (8) of the elements or members 13 in the channels or grooves 11 of the base-board or tray 10 to form the first horizontal picture, as hereinbefore explained, the first six (6) of the fillers 14, 15, 16, 17, 18 and 19 (Figure 3) will be selected, together with two of the remaining elements or members 13, other than fillers, and will be laid lengthwise on top of the first layer of elements or members 13 with their wider faces $a$ resting on the similar faces $a$ of the latter, the fillers 14 to 19 being disposed between the two selected elements or members 13, which are to be employed in starting pictures to be formed on the oppositely inclined planes of the pyramidal assembly when the same is completed. Next, seven (7) of the remaining picture forming elements or members 13 will be selected and laid in properly matched sequence in the spaces formed between the next lower layer of the elements or members. When properly positioned, the wider faces $a$ of these last laid elements or members 13 will form a horizontal plane surface and expose to view from the same a completed picture. As each successive layer of elements or members 13 are placed in position in the assembly, and the wider faces $a$ of the same are exposed in uppermost position, a corresponding number of pictures will be produced, and by properly matching the exposed outer narrower faces *b* and *c*, as the case may be, of the outermost of the elements or members 13, pictures will be formed on the oppositely inclined plan surfaces formed by these matched faces. Also, when the filler elements or members 14 to 34 (Figure 3) have been properly positioned in the assembly, the pictorial portions on their opposite ends will match up with pictorial portions on the opposite ends of all of the other of the elements or members 13 employed.

After the pyramidal assembly has been thus completed, two additional pictures may be formed by reversing the narrower faces *b* or *c* of the outer of the elements or members 13, which may be readily accomplished by withdrawing these elements or members, and turning them end for end, and then inserting them back into their original positions. It is also to be noted that the thirty-six (36) elements or members 13 employed in the pyramidal assembly may be assembled into groups or units of four (4) each, with their narrower faces *b* and *c* in abutting relation, after the manner as illustrated in Figure 6, and the several groups or units assembled together, as in Figure 5, for forming four (4) additional completed pictures, the several groups or units being given successive quarter turns in their assembled relation for the purpose.

It is also to be noted of the base-board or tray 10 and its flanged side and end walls 12, and also of the elements or members 13, that the same may be made from any suitable material, such as wood, metal or card-board, and that the latter may have the pictorial portions placed on their several side and end faces in any suitable or desired manner, as by being marked, burnt or printed thereon, or, in the case of the completed pictorial illustrations being printed or formed on separate sheets and cut into strips or pieces of proper size, such strips or pieces may be pasted on the same.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. A device of the character described comprising a plurality of multi-faced members, each having its several side and end faces provided with portions of pictorial representations of various subjects, said members being adapted to be assembled into side to side abutting relation, whereby completed pictures of selected subjects will be formed by the matching together of the pictorial portions on their uppermost and end faces.

2. A device of the character described comprising a plurality of elongated multi-faced members, each having its several side and end faces provided with portions of pictorial representations of various subjects, said members being adapted to be interchangeably assembled into side to side abutting relation, whereby completed pictures of selected subjects will be formed by the matching together of the complemental portions of the pictorial representations on their exposed side and end faces.

3. A device of the character described comprising a plurality of elongated multi-faced members, each having its several side and end faces provided with portions of pictorial representations of various subjects, said members being interchangeably selective so that certain of the same are adapted to be assembled together in various combinations to present completed pictures of selected subjects when the members are turned to expose the complemental of their several side faces successively to view, a completed picture being presented to view on the end faces of said members when the latter are assembled in one order of their grouping.

4. A device of the character described comprising a plurality of substantially triangularly shaped members, each having its several faces provided with portions of pictorial representations of various subjects, certain of said members being adapted to be assembled together in various combinations to present completed pictures of selected subjects when the members are turned to expose the complemental of their several faces successively to view.

5. A device of the character described comprising a plurality of substantially elongated triangularly shaped members, each having its several faces provided with portions of pictorial representations of various subjects, certain of said members being adapted to be assembled in groups with the complemental of their faces exposed to view, and with the portions of the pictorial representations thereof matched to present a completed picture of a selected subject.

6. A device of the character described comprising a plurality of substantially elongated triangularly shaped members, each having its several faces provided with portions of pictorial representations of various subjects, certain of said members being adapted to be assembled in groups with the complemental of their faces exposed to view and with the portions of the pictorial representations thereof matched to present a completed picture of a selected subject, the several members of the groups of said members being adapted to be turned to expose the other of their faces successively to view to present completed pictures corresponding in number to the number of faces of the said members.

7. A device of the character described comprising a plurality of substantially elongated triangularly shaped members, each having its several side faces provided with portions of pictorial representations of various subjects, said members being adapted to be assembled in superimposed relation with the complemental of their faces exposed to view, and with the portions of the pictorial representations thereof matched to present completed pictures thereon of selected subjects.

8. A device of the character described comprising a plurality of substantially elongated triangularly shaped members, each having its several side and end faces provided with portions of pictorial representations of various subjects, said members being adapted to be assembled in superimposed relation with the complemental of their faces exposed to view and with the portions of the pictorial representations thereof matched to present completed pictures of selected subjects 9. A device of the character described comprising a plurality of substantially elongated triangularly shaped members, each having its several side and end faces provided with portions of pictorial representations of various subjects, said members being adapted to be assembled in superimposed relation with the complemental of their faces exposed to view and with the portions of the pictorial representations thereof matched to present completed pictures of selected subjects, and a supporting base for said assembled members.

JOSEPH DE BRACHT.